United States Patent
Schmid

(10) Patent No.: US 11,486,438 B2
(45) Date of Patent: Nov. 1, 2022

(54) ASSEMBLY WITH ONE SHAFT AND ONE RADIAL BALL BEARING

(71) Applicant: NIDEC Motors & Actuators (Germany) GmbH, Bietigheim-Bissingen (DE)

(72) Inventor: Jürgen Schmid, Brackenheim (DE)

(73) Assignee: NIDEC Motors & Actuators (Germany) GmbH, Bietigheim-Bissingen (DE)

(*) Notice: Subject to any disclaimer, the term of this patent is extended or adjusted under 35 U.S.C. 154(b) by 0 days.

(21) Appl. No.: 17/206,259

(22) Filed: Mar. 19, 2021

(65) Prior Publication Data

US 2021/0293272 A1    Sep. 23, 2021

(30) Foreign Application Priority Data

Mar. 19, 2020 (DE) .................. 10 2020 107 580.4

(51) Int. Cl.
*F16C 35/06* (2006.01)
*F16C 3/02* (2006.01)
*F16C 19/06* (2006.01)
*F16C 35/063* (2006.01)

(52) U.S. Cl.
CPC ............... *F16C 3/02* (2013.01); *F16C 19/06* (2013.01); *F16C 35/063* (2013.01)

(58) Field of Classification Search
CPC .. F16C 3/02; F16C 19/06; F16C 19/08; F16C 19/163; F16C 19/181; F16C 35/063; F16C 2226/80; F16C 2240/40; F16C 2240/70

See application file for complete search history.

(56) References Cited

U.S. PATENT DOCUMENTS

| | | | | |
|---|---|---|---|---|
| 4,089,570 A | * | 5/1978 | Markfelder | F16C 19/364 384/510 |
| 4,364,613 A | * | 12/1982 | Mangiavacchi | F16C 35/063 384/536 |
| 4,365,686 A | | 12/1982 | Orain | |
| 2013/0178298 A1 | * | 7/2013 | Hatogai | F16C 27/066 464/179 |

FOREIGN PATENT DOCUMENTS

| DE | 2950938 A1 | 6/1980 |
|---|---|---|
| DE | 102008050334 A1 | 4/2010 |

(Continued)

OTHER PUBLICATIONS

German Examination Report for German Application No. 10 2020 107 580.4, dated Jan. 18, 2021 with partial translation, 12 pages.

*Primary Examiner* — Phillip A Johnson
(74) *Attorney, Agent, or Firm* — RatnerPrestia

(57) ABSTRACT

An assembly has a radial ball bearing including a bearing inner ring, and a rotatable shaft with a shaft end region with a bearing seat. The bearing seat has a shoulder on one side, on which the bearing inner ring of the radial ball bearing is seated for supporting the shaft. The bearing seat is shortened in the longitudinal direction relative to the radial ball bearing, and extends toward a height of the radial ball bearing. The bearing seat terminates at a distance (L) from an orthogonal projection from the proximalmost points of a distalmost row of balls onto the bearing seat surface such that L=k*D, wherein k is in a range between 0.7 and 0.5.

14 Claims, 4 Drawing Sheets

(56) References Cited

FOREIGN PATENT DOCUMENTS

| | | | | |
|---|---|---|---|---|
| DE | 102014211363 | A1 | 12/2015 | |
| EP | 2351681 | A1 | 8/2011 | |
| FR | 1585841 | A | 1/1970 | |
| FR | 2730538 | A1 * | 8/1996 | ............ F16C 35/063 |
| GB | 417398 | A * | 10/1934 | |
| GB | 696620 | | 9/1953 | |
| JP | 2009156283 | A | 7/2009 | |
| WO | 2019189302 | A1 | 10/2019 | |

* cited by examiner

ASSEMBLY WITH ONE SHAFT AND ONE RADIAL BALL BEARING

CROSS-REFERENCE TO RELATED APPLICATIONS

This patent application claims priority to German Patent Application No. 102020107580.4, filed Mar. 19, 2020, which is incorporated by reference herein in its entirety.

FIELD OF THE INVENTION

The present invention relates to an assembly comprising a shaft and a radial ball bearing, and to a method of manufacturing a shaft.

BACKGROUND OF THE INVENTION

Shafts, for example, can be rotatably mounted in a radial ball bearing. Radial ball bearings of this type are well known in the prior art. Radial ball bearings are, for example, deep groove ball bearings or angular contact ball bearings and the like, which can be of single or double row design. Angular contact ball bearings have raceways in the inner and outer rings that are offset from each other in the direction of the bearing axis. They are designed for bearing arrangements that must support combined loads, such as radial and axial loads acting simultaneously. The connection between the radial ball bearing and the shaft is made by a combination of positive and frictional locking. The form fit is established between a shoulder on the shaft and a shoulder of the inner ring. The aim of this is to be able to transmit relatively high forces in the axial direction with a small overlap of the shaft outer diameter and the bearing inner ring. The frictional connection, on the other hand, ensures that a torque that builds up, for example, during cold startup of the rolling bearing can be transmitted from the shaft to the inner ring.

Due to component tolerances, it may not be possible to achieve a perfect form fit between the shaft and bearing. This can lead to the connection settling under load or during operation.

It is therefore the object of the invention to propose an assembly with a shaft and a radial ball bearing in which the form fit is completely achieved.

SUMMARY OF THE INVENTION

This object is achieved by an assembly and a manufacturing method as described herein.

Accordingly, a unit comprising a shaft and a radial ball bearing having a bearing inner ring is provided, the shaft having a shaft end region with a bearing seat which has a shoulder on one side and on which the bearing inner ring of the radial ball bearing is seated for supporting the rotatable shaft. The bearing seat is shortened in the longitudinal direction relative to the radial ball bearing, the bearing seat extending to a height of the radial ball bearing which lies at a distance L (along the bearing seat) from an orthogonal projection from the respective bearing innermost point of the row of balls arranged at the end of the bearing seat remote from the shoulder onto the bearing seat surface, and the following relationship applying:

$L = k \cdot D$, where D is the sphere diameter and k is in a range between 0.7 and 0.5.

The bearing seat projects beyond the innermost point of the ball row arranged at the end of the bearing seat remote from the shoulder in the direction of the free end.

The bearing seat thus covers only part of the inside of the bearing inner ring. The press-in distance is thus shortened, so that a complete form fit of the bearing inner ring with the shaft is possible. Material is also saved. In the event that the bearing is single row, the row located at the end of the bearing seat remote from the shoulder is the only row of the bearing.

It is advantageous if k is less than 0.65, especially about 0.6.

The bearing inner ring preferably has a constant inner diameter over its entire height.

It is advantageous if the shaft has a shoulder in the shaft end region, adjacent to the bearing seat, towards the shaft end, the outer diameter of the shoulder being smaller than the inner diameter of the bearing inner ring. This shaft end can serve as a clamping journal during machining of the shaft.

Preferably, the bearing seat is formed by a shoulder on the shaft, which forms an annular contact surface for the bearing inner ring arranged concentrically to the longitudinal axis of the shaft. The bearing inner ring can thus be brought into positive engagement with the annular contact surface in order to transmit axial forces.

It is preferred that the shaft is hollow at least in some areas and has internal teeth.

The shaft preferably also has a shoulder on the inside, which tapers the inside diameter towards the shaft end.

Preferably, the internal toothing adjoins the shoulder on the inside, towards the shaft end, with the internal diameter of the area following the shoulder being larger than the diameter of the internal toothing.

In one embodiment, the shaft is closed at the shaft end, which simplifies machining.

Furthermore, it is preferred if the bearing inner ring of the radial ball bearing is seated on the bearing seat of the shaft end area with frictional engagement.

Preferably, the shoulder of the bearing inner ring is in contact with the annular contact surface of the shaft so that a form fit is formed.

In an advantageous embodiment, the bearing outer ring is supported on another component in the axial direction at its shoulder remote from the shoulder. The axial forces can thus be transmitted from the shaft to this other component and vice versa.

The radial ball bearing is preferably a single-row angular contact ball bearing. The connecting lines of the two points of contact preferably meet in the area of the shaft, outside the shaft end area. The point of intersection is preferably on the longitudinal axis of the shaft. The angle formed between the lines at the point of intersection is then preferably about 90°.

Further provided is a method of manufacturing a previously described shaft having a shaft end portion comprising a bearing seat for a radial ball bearing, the method comprising the following steps in chronological order:
  a) Manufacture of a cylindrical intermediate blank;
  b) Cold forming of the cylindrical intermediate blank in a press in such a way that the resulting blank is hollow at least in certain areas and has internal teeth in the shaft end area which are concentric with the longitudinal axis of the shaft,
  c) Machining of the blank in a lathe to form the bearing seat on the outside of the blank.

This makes production much simpler and more cost-effective.

Preferably, in process step b, a shoulder is introduced into the shaft end region, the subsequent region having an outer diameter smaller than the outer diameter of the bearing seat, so that the shaft end can be used as a clamping spigot in process step c.

It is preferred that the internal splines are concentric with the longitudinal axis of the shaft and are located in the area between the shaft end and the bearing seat.

The radial ball bearing is preferably a single row angular contact ball bearing.

BRIEF DESCRIPTION OF THE DRAWINGS

Preferred embodiments of the invention are explained in more detail below with reference to the drawings. Identical or functionally identical components are provided with the same reference signs across the figures. They show.

DETAILED DESCRIPTION OF THE INVENTION

Figure 1:
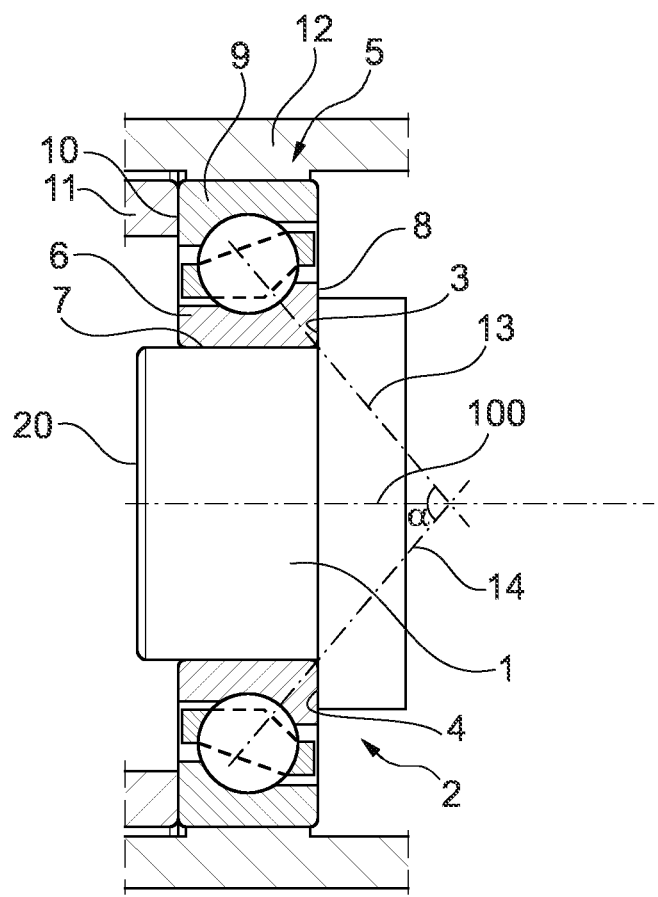
FIG. 1: An assembly with shaft and angular contact ball bearing from the prior art.

FIG. 1 shows a known circular-cylindrical shaft 1, which has a shoulder 3 in a shaft end region 2, which forms an annular contact surface 4, which is arranged concentrically to the longitudinal axis 100 of the shaft 1. The shaft is part of a rotor in an electrical machine. The shoulder 3 tapers the shaft 1 in a step-like manner in the outer diameter towards the shaft end 20. The shaft 1 is supported in a single row angular contact ball bearing 5. The bearing inner ring 6 of the angular contact ball bearing 5 is seated on the bearing seat 7 of the shaft end section 2 with frictional engagement. The inner circumferential surface of the bearing inner ring 6 is in full contact with the outer surface of the shaft 1. The shoulder 8 of the bearing inner ring 6 is in contact with the annular contact surface 4 of the shaft 1, so that a form fit is formed. The bearing outer ring 9 is supported on its shoulder 10, which is remote from the shoulder, against a further component 11 in the axial direction. The axial forces can thus be transmitted from the shaft 1 to this further component 11 and vice versa. The bearing outer ring 9 is pressed into a housing 12 on the circumferential side. The connecting lines 13,14 of the two points of contact meet in the area of the shaft 1 outside the shaft end area 2. The point of intersection lies on the longitudinal axis 100 of the shaft 1. The angle (α) formed between the lines at the point of intersection is approximately 90°.

Figure 2:
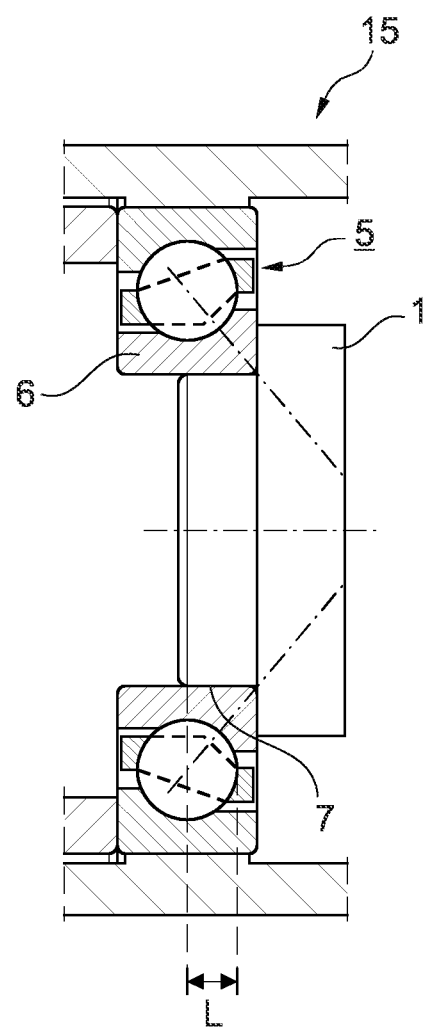
FIG. 2: A unit according to the invention with shaft and angular contact ball bearing.
Figure 3:
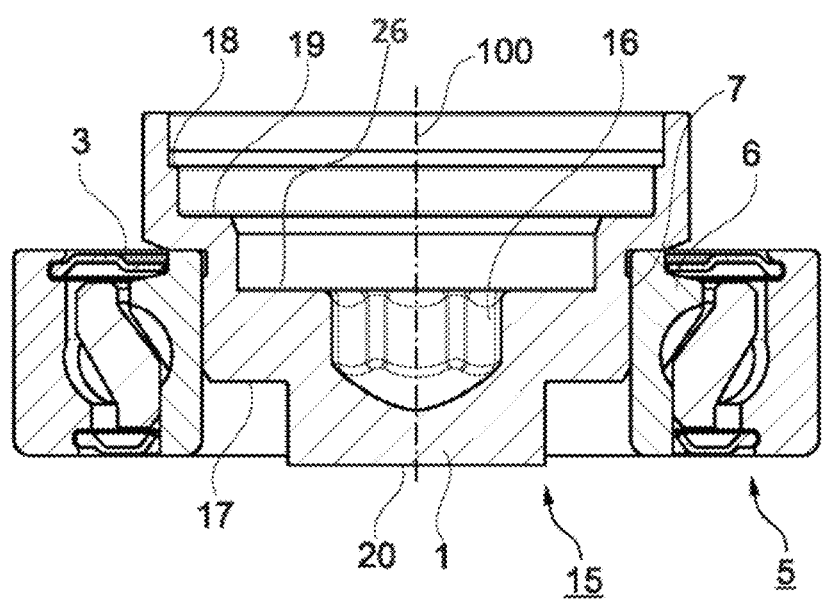
FIG. 3: a longitudinal section through the assembly of FIG. 2, and FIG. 4: A schematic diagram of a double-row deep groove ball bearing.

FIGS. 2 and 3 show an embodiment of the unit 15 according to the invention comprising shaft 1 and angular contact ball bearing 5. In contrast to the state of the art, the height of the bearing seat hL on the shaft 1 is significantly smaller than the height of the bearing inner ring hI on the inner circumferential surface. Otherwise, the structural unit 1 corresponds to the structural unit of FIG. 1. The contact area for frictional engagement is thus significantly reduced compared to the prior art. The bearing inner ring 6 has a constant diameter on its inner side over the entire height hI.

Shortening the shaft 1 or the bearing seat 7 makes it easier to achieve the desired, complete positive locking, since the force required for frictional locking is reduced. Thus, when the bearing inner ring 6 is pushed onto the end of the shaft, sufficient force is available for the form fit. The reduced guide length can also prevent the bearing inner ring 6 from tilting relative to the shaft 1 and thus prevent the form fit from being fully established.

Since the form fit can be produced completely during assembly due to the shortened overlap of the inside of the bearing inner ring with the shaft end area, no frictional connection is required over the entire bearing height for reliable transmission of the torque, so that no disadvantages arise here due to the shortened overlap.

In the manufacture of the shaft 1, a blank is first produced from a cylindrical intermediate blank by cold forming in a press, which already has the internal splines 16 shown in FIG. 3. The internal splines are used to transmit torque to a ball screw mounted in the hollow shaft (not shown). The blank is machined in a lathe. The rotationally symmetrical external and internal geometry is formed in the process.

The shaft 1 shown in FIG. 3 has a second shoulder 17 adjoining the first shoulder 3 towards the shaft end 20. The outer diameter of the second shoulder 17 is smaller than the inner diameter of the bearing inner ring 6. The internal spline 16 is formed concentrically to the longitudinal axis 100 of the shaft 1 and lies within the two shoulders 3,17, preferably largely within the first shoulder 3 in the interior of the shaft 1. The shaft 1 also has shoulders 18,19,26 on the inside, also rotationally symmetrical to the longitudinal axis, which taper the inner diameter towards the shaft end 20. The shoulder 26 closest to the shaft end 20 is adjoined by the internal teeth 16 towards the shaft end 20. The inside diameter of the shoulder 26 is larger than the diameter of the internal splines 16. The shaft 1 is closed at this shaft end 20.

The second shoulder 17 on the outside of the shaft 1, the shaft end 20, serves as a clamping spigot or journal for machining. The plane in which the component (blank) to be machined is clamped has a smaller distance to the inner geometry produced via the forming process as known from the prior art. The (run-out) deviations from the inner geometry are therefore smaller.

For directional reference, the terms "distal" and "proximal" may be used, with the shaft end 20 being considered a distal end.

Figure 4:
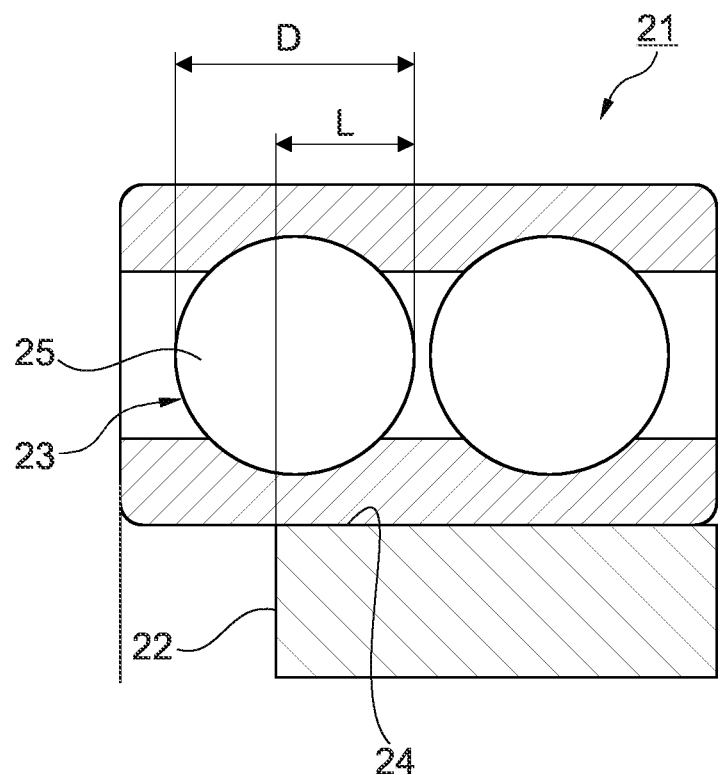

FIG. 4 shows an example of a double-row deep groove ball bearing 21. The shortening of the bearing seat is defined by the distance L between the free (distal) end of the bearing seat 22 and a projection from the innermost (proximalmost) point of the (distalmost) row of balls 23 arranged at the edge of the bearing seat onto the bearing seat surface 24, as shown in the longitudinal section of the bearing. The balls 25 of the ball row 23 have a diameter D. Preferably, L=k*D applies, where k lies in a range between 0.7 and 0.5, preferably at approximately 0.6. The bearing seat extends to the height of the bearing defined by the distance L. This definition is quite generally applicable to single and double row radial ball bearings, in particular to the angular contact ball bearing of FIGS. 1 to 3.

What is claimed:

1. An assembly comprising a rotatable shaft having a longitudinal axis and a radial ball bearing, the radial ball bearing comprising at least one row of balls and a bearing inner ring, each ball having a diameter (D), the shaft having a distal end and a shaft end region with a bearing seat having a bearing seat surface, the bearing seat having a first shoulder on a proximal side of the bearing seat and on which the bearing inner ring of the radial ball bearing is seated for the purpose of supporting the shaft, the bearing seat shortened in the longitudinal direction relative to the radial ball bearing, the bearing seat extending relative to the radial ball bearing to a distance (L) from an orthogonal projection from proximalmost points of a distalmost row of the at least one row of balls onto the bearing seat surface, such that:

L=k*D, wherein k is in a range between 0.7 and 0.5.

2. The assembly according to claim 1, wherein k is less than 0.65.

3. The assembly of claim 2, wherein k is 0.6.

4. The assembly of claim 1, wherein the bearing inner ring has a constant inner diameter over an entire height.

5. The assembly of claim 1, wherein the shaft has a second shoulder in the shaft end region, adjoining the bearing seat, towards a distal end of the shaft, wherein an outer diameter of the shaft end region at the distal end is smaller than an inner diameter of the bearing inner ring.

6. The assembly of claim 1, wherein the first shoulder contacts an annular contact surface defined by the bearing inner ring, wherein the annular contact surface is arranged concentrically to a longitudinal axis of the shaft.

7. The assembly of claim 1, wherein the shaft has a hollow region and has internal toothing inside the hollow region.

8. The assembly of claim 7, wherein the shaft also has an inside shoulder in the hollow region, wherein the inside shoulder tapers an inner diameter of the hollow region towards the distal end.

9. The assembly of claim 8, wherein the internal toothing adjoins the inside shoulder at a region having an internal diameter larger than a diameter of the internal toothing.

10. The assembly of claim 1, wherein the shaft is closed at the distal end.

11. The assembly of claim 1, wherein the radial ball bearing is a single-row angular contact ball bearing.

12. A method of manufacturing a shaft having a distal end and a shaft end portion, the shaft end portion having a bearing seat for a radial ball bearing the assembly of claim 1, wherein the method comprises the steps of:
   a) manufacturing a cylindrical intermediate blank;
   b) cold forming of the cylindrical intermediate blank in a press such that the cold formed blank is hollow at least in certain areas and has internal teeth in a shaft end region, wherein the internal teeth are concentric with a longitudinal axis of the shaft; and
   c) machining the blank in a lathe to form the bearing seat on an outside of the blank.

13. The method according to claim 12, further comprising, in method step b, introducing an additional shoulder into the shaft end region, wherein an outside diameter of the shaft at the distal end is smaller than an outside diameter of the bearing seat, and in method step c, using the distal end as a clamping spigot.

14. The method of claim 12, wherein the internal teeth are arranged in an area between the shaft end and the bearing seat.

* * * * *